(12) United States Patent
Hallemeier et al.

(10) Patent No.: US 7,248,762 B2
(45) Date of Patent: Jul. 24, 2007

(54) OPTICAL FIBER TRANSMISSION SYSTEM WITH INCREASED EFFECTIVE MODAL BANDWIDTH TRANSMISSION

(75) Inventors: Peter Hallemeier, North Haven, CT (US); Mark Coylar, Fountainville, PA (US); Eitan Gertal, Gwynedd, PA (US); Heider Ereifej, Chalfont, PA (US)

(73) Assignee: Optium Coporation, Chalfont, PA (US)

( * ) Notice: Subject to any disclaimer, the term of this patent is extended or adjusted under 35 U.S.C. 154(b) by 0 days.

(21) Appl. No.: 11/268,340

(22) Filed: Nov. 7, 2005

(65) Prior Publication Data

US 2006/0051017 A1    Mar. 9, 2006

Related U.S. Application Data

(60) Division of application No. 10/605,490, filed on Oct. 2, 2003, now abandoned, which is a continuation-in-part of application No. 10/605,107, filed on Sep. 9, 2003.

(60) Provisional application No. 60/481,166, filed on Aug. 1, 2003.

(51) Int. Cl.
    *G02B 6/26*     (2006.01)
    *H04B 10/13*    (2006.01)

(52) U.S. Cl. .......................... 385/28; 385/50; 398/142; 398/143

(58) Field of Classification Search .................... None
    See application file for complete search history.

(56) References Cited

U.S. PATENT DOCUMENTS 5,077,815 A * 12/1991 Yoshizawa et al. ........... 385/28

| | | |
|---|---|---|
| 5,416,862 A | 5/1995 | Haas et al. |
| 6,088,147 A * | 7/2000 | Weber et al. ............... 359/237 |
| 6,154,589 A | 11/2000 | Kirk et al. |
| 6,185,346 B1 | 2/2001 | Asawa et al. |
| 6,356,680 B1 | 3/2002 | Kirk et al. |
| 6,415,076 B1 | 7/2002 | DeCusatis |
| 6,487,338 B2 | 11/2002 | Asawa et al. |

(Continued)

OTHER PUBLICATIONS

Haas, A Mode-Filtering Scheme For Improvement Of The Bandwidth-Distance Product In Multimode Fiber Systems, Journal Of Lightwave Technology, Jul. 1993, pp. 1125-1131, vol. 11, No. 7, IEEE.

(Continued)

*Primary Examiner*—Kevin Wood
*Assistant Examiner*—Omar Rojas
(74) *Attorney, Agent, or Firm*—Kurt Rauschenbach; Rauschenbach Patent Law Group, LLC

(57) ABSTRACT

A multi-mode optical fiber link is described. The multi-mode optical fiber link includes a first spatial mode converter that is coupled to a first single mode optical fiber. The first spatial mode converter conditions a modal profile of an optical signal propagating from the single mode optical fiber to the first spatial mode converter. A multi-mode optical fiber is coupled to the first spatial mode converter. A second spatial mode converter is coupled to an output of the multi-mode optical fiber and to a second single mode optical fiber. The second spatial mode converter reduces a number of optical modes in the optical signal. Both the first and the second spatial mode converters increase an effective modal bandwidth of the optical signal.

30 Claims, 7 Drawing Sheets

U.S. PATENT DOCUMENTS

| | | |
|---|---|---|
| 6,510,265 B1 | 1/2003 | Giaretta et al. |
| 2002/0126954 A1 | 9/2002 | Asawa et al. |
| 2002/0191906 A1 | 12/2002 | Price et al. |
| 2003/0011847 A1 | 1/2003 | Dai et al. |

OTHER PUBLICATIONS

Ghandi, et al., Electronic Dispersion Compensation, Santel Networks, Inc. 2002.

Donlagic, et al., Propagation Of The Fundamental Mode In Curved Graded Index Multimode Fiber And Its Application In Sensor Systems, Journal of Lightwave Technology, Mar. 2000, pp. 334-342, vol. 18, No. 3, IEEE.

Brown, Bandwidth And Rise Time Calculations For Digital Multimode Fiber-Optic Data Links, Journal of Lightwave Technology, May 1992, pp. 672-678, vol. 10, No. 5, IEEE.

Donlagic, et al., Microbend Sensor Structure For Use In Distributed And Quasi-Distributed Sensor Systems Based On Selective Launching And Filtering Of The Modes In Graded Index Multimode Fiber, Journal of Lightwave Technology, Oct. 1999, pp. 1856-1868, vol. 17, No. 10, IEEE.

* cited by examiner

OPTICAL FIBER TRANSMISSION SYSTEM WITH INCREASED EFFECTIVE MODAL BANDWIDTH TRANSMISSION

CROSS REFERENCE TO RELATED APPLICATIONS

This application is a divisional patent application of U.S. patent application Ser. No. 10/605,490 filed on Oct. 2, 2003, now abandoned which is a continuation-in-part of U.S. patent application Ser. No. 10/605,107, filed on Sep. 9, 2003, entitled "Optical Transmitter for Increased Effective Modal Bandwidth Transmission," which claims priority to U.S provisional patent application No. 60/481,166, filed on Aug. 1, 2003, entitled "Optical Fiber Transmission System with Increased Effective Modal Bandwidth." The entire disclosures of U.S. patent application Ser. Nos. 10/605,490 and 10/605,107 and U.S. provisional patent application No. 60/481,166 are incorporated herein by reference.

BACKGROUND OF INVENTION

Many existing optical fiber transmission systems use multi-mode optical fiber. Multi-mode optical fiber is widely used because it is relatively inexpensive, easy to install and because it is suitable for use with low cost transmitter and receiver components. The relatively large optical fiber core and numerical aperture of multi-mode optical fibers allows more light to be launched into the optical fiber, as compared to single-mode optical fibers. Therefore, such systems can use lower power and lower cost optical sources. For these reasons, local area networks have employed multi-mode optical fiber for many years. Some data communication systems, such as Fiber Data Distribution Interface (FDDI) systems are specifically designed to use multi-mode optical fiber. Known multi-mode optical fiber transmission systems, however, have relatively low bandwidth-distance products for a given bit error rate (BER) and, therefore, are not suitable for many state-of-the art communication systems.

BRIEF DESCRIPTION OF DRAWINGS

This invention is described with particularity in the detailed description. The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

The present invention relates to methods and apparatus for increasing the effective modal bandwidth of optical fiber transmission systems. The term "effective modal bandwidth" is defined herein to mean the bandwidth-distance product of the transmission system for a given Bit Error Rate (BER) and/or a certain transmission specification. Increasing the effective modal bandwidth of a multi-mode optical fiber transmission system will allow providers to increase the data rate and will extend the useful service life of many installed multi-mode optical fiber transmission systems.

One aspect of the present invention is embodied in the design of optical transmitters that have improved or optimum spectral and phase characteristics for transmitting data in a multi-mode optical fiber. Another aspect of the present invention is embodied in the use of spatial filtering to reduce the number of modes propagating in a multi-mode optical fiber. These aspects alone or in combination increase the effective modal bandwidth of multi-mode optical fiber transmission systems.

Figure 1:
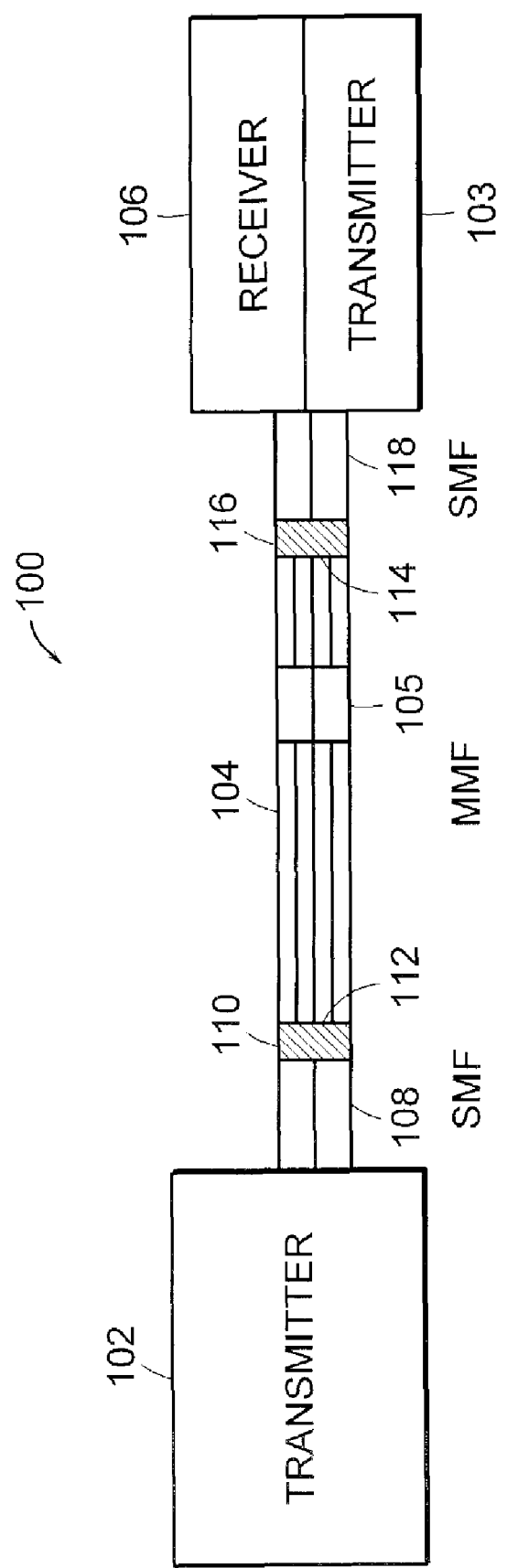
FIG. 1 illustrates a block diagram of a multi-mode optical fiber transmission system that includes two spatial mode optical converters according to the present invention.

FIG. 1 illustrates a block diagram of a multi-mode optical fiber transmission system 100 that includes two spatial mode optical converters according to the present invention. The transmission system 100 includes an optical transmitter 102, a multi-mode optical fiber link 104, and an optical receiver 106. The optical transmitter 102 generates optical signals for data transmission through the multi-mode optical fiber link 104.

In one embodiment, the optical transmitter 102 includes an intensity modulated optical source, an electro-absorption modulated laser, an integrated laser modulator, or a laser modulator having parameters that generate optical signals with improved or optimal spectral and phase characteristics for transmission through an optical fiber link as described herein. In one embodiment, the optical transmitter 102 includes more than one optical source that generates additional optical signals at different wavelengths. In one embodiment, the optical source includes a WDM optical source that generates a plurality of optical signals and each of the plurality of optical signals has a different wavelength.

In some embodiments, the optical transmitter 102 includes additional optical sources that are used to generate additional optical signals that increase the data capacity of the multi-mode optical fiber link 104. In some of these embodiments, the multi-mode optical fiber transmission system 100 includes additional optical transmitters 102 that are used to generate optical signals that propagate in opposite directions in the same multi-mode optical fiber. Separate optical carriers can be used to minimize cross-talk between optical signals propagating in opposite directions.

The optical transmitter 102 is optically coupled to a first single-mode optical fiber 108. Optical signals generated by the optical transmitter 102 propagate down the first single-mode optical fiber 108. A first spatial mode converter 110 is optically coupled to the first single-mode optical fiber 108. The first spatial mode converter 110 conditions the modal profile of the optical signal propagating through the first spatial mode converter 110. The first spatial mode converter 110 can condition the modal profile in many ways in order to increase the effective bandwidth of the optical signal or to increase other performance metrics of the transmission system 100. For example, the first spatial mode converter 110 can condition the modal profile of the optical signal to reduce phase and sideband information, noise, or modal dispersion in the optical signal.

An input 112 of the multi-mode optical fiber link 104 is optically coupled to the first spatial mode converter 110. The multi-mode optical fiber link 104 can include a single length of multi-mode optical fiber or can include multiple lengths of multi-mode optical fiber that are coupled together. The multiple lengths of multi-mode optical fiber can be butt coupled together. For example, the butt couplings can be tapered optical fiber sections or polished optical fiber sections.

In one embodiment, the multi-mode optical fiber link 104 includes at least one single mode optical fiber link section 105. The single mode optical fiber link section 105 can be a long haul optical fiber link that connects distant networks. In this embodiment, the transmission system 100 of the present invention can be used to link multiple enterprise networks that are separated by long distances.

A second spatial mode converter 116 is optically coupled to an output 114 of the multi-mode optical fiber link 104. The second spatial mode converter 116 is also optically coupled to a second single-mode optical fiber 118. The second spatial mode converter 116 reduces the number of modes in the optical signal that are transmitted through the second spatial mode converter 116 and, therefore, limits the number of dominant modes that are received by the optical receiver 106.

The second spatial mode converter 116 can reduce the number of higher-order modes, the number of lower-order modes or both the number of higher-and lower-order modes in the optical signal propagating through the second spatial mode converter 116. By lower-order modes, we mean modes in which most of the energy is localized around the center of the optical fiber core of the multi-mode optical fiber. By higher-order modes, we mean modes in which most of the energy is localized outside of the center of the optical fiber core of the multi-mode optical fiber.

Both the first 110 and the second spatial mode converters 116 increase the effective modal bandwidth of the multi-mode optical fiber transmission system 100. The first spatial mode converter 110 can be any type of spatial mode converter that conditions the modal profile. The second spatial mode converter 116 can be any type of spatial mode converter that reduces the number of modes in the optical signal generated by the optical transmitter 102. For example, the first and second spatial mode converters 110, 116 can include a fusion splice or a butt coupling between the multi-mode optical fiber link 104 and a respective one of the first 108 and the second single-mode optical fiber 118. The butt coupling can be positioned at a bulkhead. The first and second spatial mode converters 110, 116 can also include a lens imaging system having refractive and diffractive elements.

The effective modal bandwidth of the multi-mode optical fiber transmission system 100 according to the present invention including the two spatial mode converters 110, 116 has a relatively high-level of immunity to polarization effects, fiber stress, vibration, and changes in temperature. In particular, there is little or no change in the effective modal bandwidth due to changes in laser polarization or changes in polarization caused by mechanical stress on the multi-mode optical fiber link 104. Also, there is little or no change in the effective modal bandwidth due to temperature changes in the fiber environment.

In one embodiment, the receiver 106 includes electronic dispersion compensation. In this embodiment, the receiver 106 includes at least one active electrical filter that is electrically coupled to the output of a detector as described herein. Also, in one embodiment, the receiver includes dynamic re-optimization that automatically adjusts at least one receiver parameter in order to compensate for changes in an average power of the received optical signal as described herein.

The present invention features a method of increasing effective modal bandwidth of an optical signal transmitted through a multi-mode optical fiber. The method includes generating an optical signal and propagating the optical signal through a single-mode optical fiber. In one embodiment, the optical signal is chosen to reduce phase corruption. The optical signal is then spatially mode converted to an optical signal having a conditioned modal profile. The spatial mode converting reduces modal dispersion, which increases an effective bandwidth of the optical signal.

The optical signal having the lower number of modes is then propagated through a multi-mode optical fiber. The optical signal propagating through the multi-mode optical fiber is then spatially mode converted, which further increases the effective bandwidth of the optical signal. The spatial mode conversions can reduce changes in effective modal bandwidth of the optical signal that are caused by physical effects, such as thermal variations in the multi-mode optical fiber, polarization effects in the multi-mode optical fiber, mechanical stress in the multi-mode optical fiber, optical fiber splices in the multi-mode optical fiber, and optical connector misalignment in the multi-mode optical fiber.

Some aspects of the present invention are described in connection with a multi-mode optical fiber link that is typically a local area fiber link. However, the present invention can also be practiced with a single-mode optical fiber link that is typically a long-haul optical fiber link.

Figure 2:
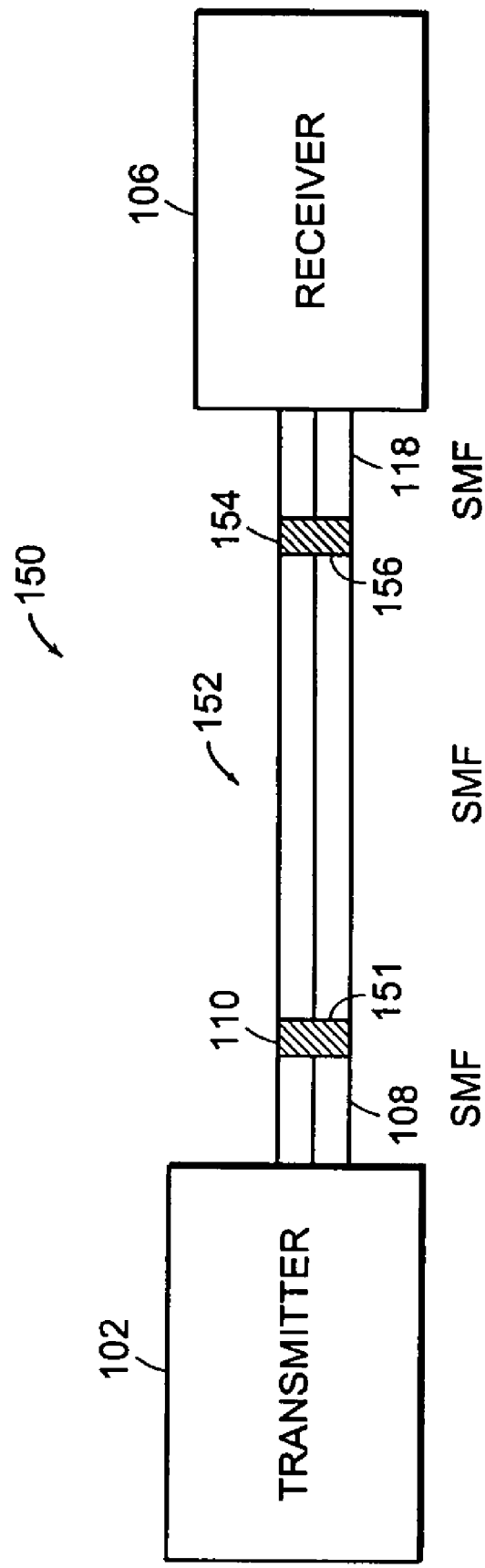
FIG. 2 illustrates a block diagram of a single-mode optical fiber transmission system that includes a spatial mode optical converter according to the present invention.

FIG. 2 illustrates a block diagram of a single-mode optical fiber transmission system 150 that includes a spatial mode optical filter according to the present invention. The transmission system 150 includes an optical transmitter 102, a single-mode optical fiber link 152, and an optical receiver 106. The single-mode optical fiber transmission system 150 is similar to the multi-mode optical fiber transmission system 100 that was described in connection with FIG. 1.

The optical transmitter 102 generates optical signals for data transmission through the single-mode optical fiber link 152. In one embodiment, the optical transmitter 102 includes more than one optical source that generates additional optical signals at different wavelengths that increase the data capacity of the single-mode optical fiber link 152. In some embodiments, the single-mode optical fiber transmission system 100 includes additional optical transmitters 103 that are used to generate optical signals that propagate in opposite directions in the same single-mode optical fiber.

The optical transmitter 102 is optically coupled to a first single-mode optical fiber 108. Optical signals generated by the optical transmitter 102 propagate down the first single-mode optical fiber 108. A first spatial mode converter 110 is optically coupled to the first single-mode optical fiber 108. The first spatial mode converter 110 conditions the modal profile in the optical signal propagating through the first spatial mode converter 110.

An input 151 of the single-mode optical fiber link 152 is optically coupled to the first spatial mode converter 110. The single-mode optical fiber link 152 can include a single length of single-mode optical fiber or can include multiple lengths of single-mode optical fiber that are fusion spliced or coupled together. An optical coupler 154 is optically coupled to an output 156 of the single-mode optical fiber link 152. The optical coupler 154 is also optically coupled to a second single-mode optical fiber 118.

The first spatial mode converter 110 increases the effective modal bandwidth of the single-mode optical fiber transmission system 150. The effective modal bandwidth of the single-mode optical fiber transmission system 150 according to the present invention including the first spatial mode converter 110 has a relatively high-level of immunity to polarization effects, fiber stress, and changes in temperature.

In one embodiment, the receiver 106 includes an electronic dispersion compensation circuit. In this embodiment, the receiver 106 includes at least one active electrical filter that is electrically coupled to the output of a detector as described herein. Also, in one embodiment, the receiver includes dynamic re-optimization that automatically adjusts at least one receiver parameter in order to compensate for changes in an average power of the received optical signal as described herein.

Figure 3A:
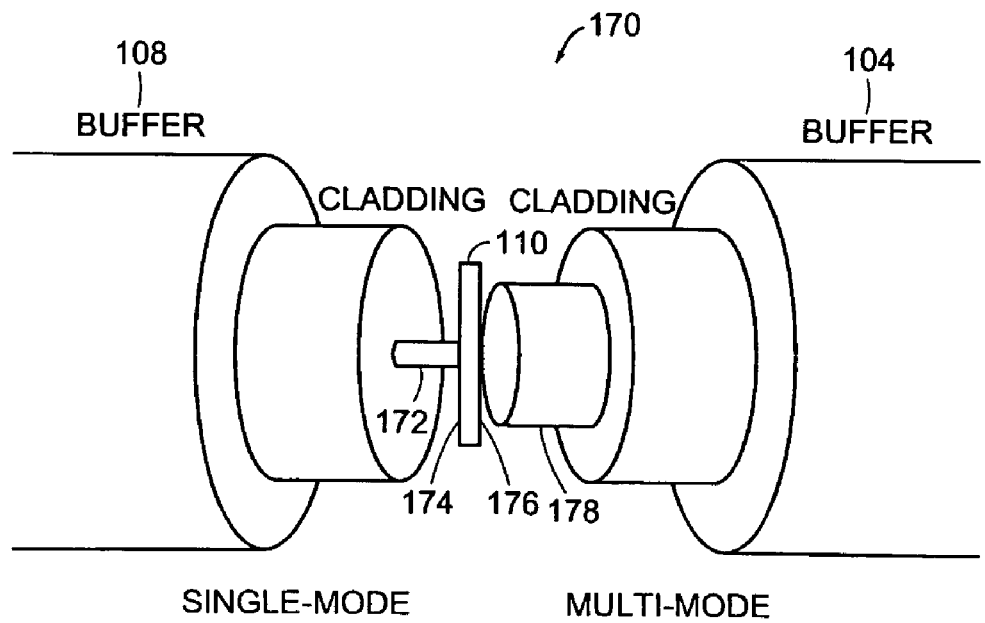
FIG. 3A is a schematic representation of the first spatial mode converter that couples the single mode optical fiber and the multi-mode optical fiber according to the present invention.

FIG. 3A is a schematic representation 170 of the first spatial mode optical converter 110 that couples the single mode optical fiber 108 and the multi-mode optical fiber link 104 according to the present invention. The single mode optical fiber 108 is designed to propagate an optical signal having a wavelength with only one type of spatial distribution (i.e. one optical mode). Single-mode optical fibers typically have a core 172 that is between about 8-10 microns in diameter.

The single mode optical fiber 108 is coupled to an input 174 of the first spatial mode converter 110. The first spatial mode converter 110 can be any type of spatial mode converter that conditions the modal profile of the optical signal that is applied to the input 174. For example, the first spatial mode converter 110 can include a fusion splice, a butt coupling, or a lens imaging system having refractive and diffractive elements. An output 176 of the spatial mode converter 110 is coupled to the multi-mode optical fiber link 104. The multi-mode optical fiber link 104 is designed to support multiple spatial distributions. Multi-mode optical fibers typically have a core 178 that is on the order of 50 microns in diameter.

In one embodiment, the first spatial mode converter 110 couples the single mode optical fiber 108 and the multi-mode optical fiber link 104 so as to achieve a predetermined offset between a center of the core 172 of the first single mode optical fiber 108 and a center of a core 178 of the multi-mode optical fiber in the link 104. For example, in this embodiment, the center of the core 172 of the first single mode optical fiber 108 can be offset between about 15-25 micrometers from the center of the core 178 of the multi-mode optical fiber in the link 104. Offsetting the center of the core 172 of the first single mode optical fiber 108 from the center of the core 178 of the multi-mode optical fiber in the link 104 changes the launch conditions.

Figure 3B:
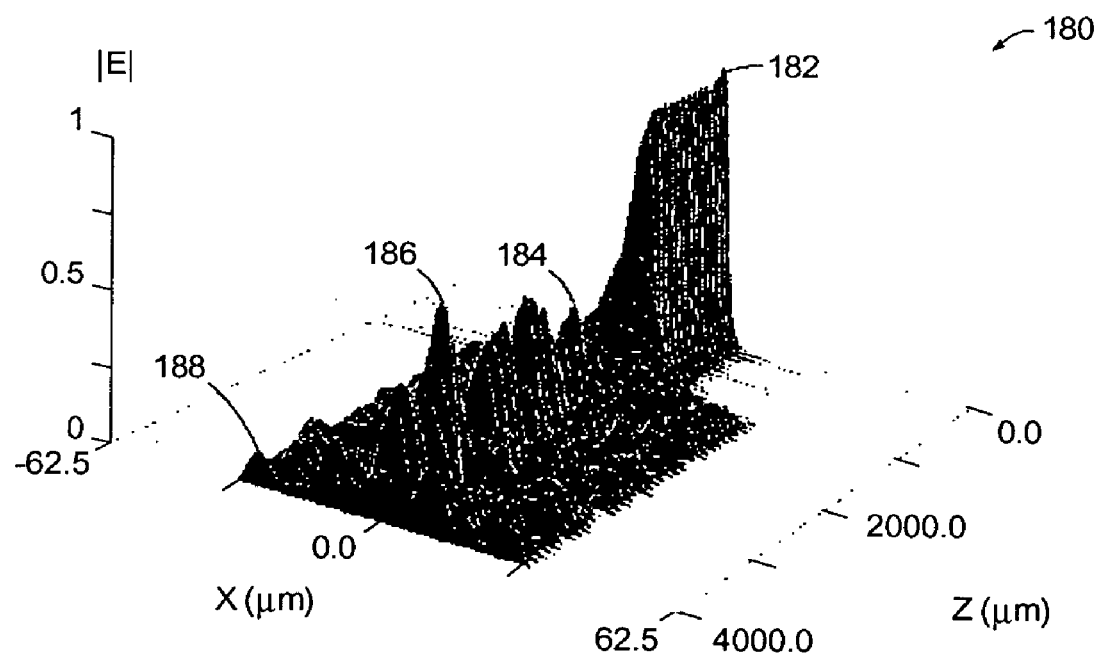
FIG. 3B illustrates an electric field diagram of an optical signal passing from the single mode optical fiber to the multi-mode optical fiber according to the present invention.

FIG. 3B illustrates an electric field diagram 180 of an optical signal passing from the single mode optical fiber 108 to the multi-mode optical fiber link 104 according to the present invention. The electric field diagram 180 illustrates the magnitude of the electric field in the optical signal as a function of distance in microns from inside the single mode optical fiber 108 to inside the multi-mode optical fiber link 104.

The magnitude of the electric field intensity 182 in the optical signal at Z=0 micrometers corresponds to the magnitude of the electric field intensity inside the single mode optical fiber 108 and at the input 174 of the spatial mode converter 110. The magnitude of the electric field intensity 184 in the optical signal at Z=1,000 micrometers corresponds to the magnitude of the electric field intensity at the mode conversion point inside the spatial mode converter 110. The magnitude of the electric field intensity 186 in the optical signal at Z=2,000 micrometers corresponds to the magnitude of the electric field intensity at the output 174 of the spatial mode converter 110. The magnitude of the electric field intensity 188 in the optical signal at Z=4,000 micrometers corresponds to the magnitude of the electric field intensity inside of the multi-mode optical fiber link 104.

The electric field diagram of an optical signal passing from the multi-mode optical fiber link 104 to the second single-mode optical fiber 118 is similar to the electric field diagram 180 of FIG. 3B, but the distance scale is inverted. The spatial mode converters 110, 116 condition and reduce the number of dominant modes that are received by the optical receiver 106.

Figure 4:
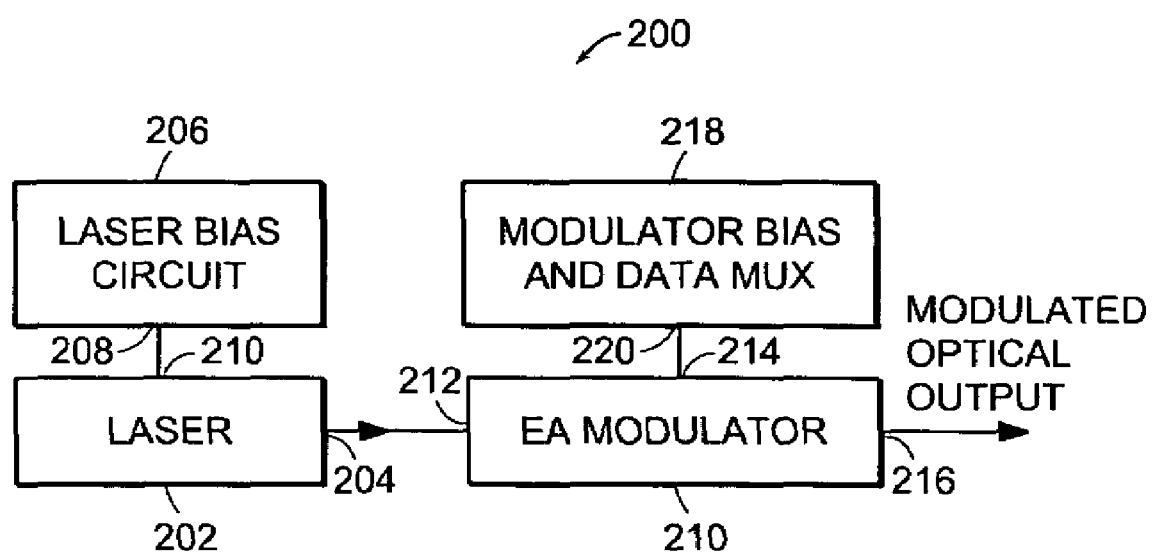
FIG. 4 illustrates a block diagram of an optical transmitter that includes an electro-absorption modulator according to the present invention that generates optical signals with improved or optimal spectral and phase characteristics for transmission through an optical fiber link.

FIG. 4 illustrates a block diagram of an optical transmitter 200 that includes an electro-absorption modulator according to the present invention that generates optical signals with improved or optimal spectral and phase characteristics for transmission through an optical fiber link. The optical transmitter 200 improves the spectral and phase characteristics for transmission through multi-mode optical fiber links, such as the multi-mode optical fiber link 104 that is described in connection with FIG. 1. In addition, the optical transmitter 200 improves the spectral and phase characteristics for transmission through single-mode optical fiber links, such as long-haul single-mode optical fiber links.

The optical transmitter 200 is designed to generate optical signals that have specific characteristics which increase or maximize immunity to variations in the phase of the optical signal received by the optical receiver 106 (FIGS. 1 and 2). One characteristic of the optical signal generated by the optical transmitter 200 is a reduction in time varying phase or sideband information in the transmission spectrum of the optical signal. Another characteristic of the optical signal generated by the optical transmitter 200 is a reduction in the phase information that is required to transmit the data in the optical fiber links 104, 152 (FIGS. 1 and 2).

Another characteristic of the optical signal generated by the optical transmitter 200 is a reduction or elimination of mixing that is required at the optical receiver 106 (FIG. 1) to recover the optical signal. Yet another characteristic of the optical signal generated by the optical transmitter 200 is an increase in isolation of optical signals reflected back towards the optical transmitter 102. In one embodiment of the invention, the optical transmitter 200 generates an optical signal with one or any combination of these characteristics. Generating an optical signal with one or more of these characteristics will increase the effective modal bandwidth of the multi-mode optical fiber transmission system 100 (FIG. 1) and the effective modal bandwidth of the single-mode optical fiber transmission system 150 (FIG. 2).

One type of optical transmitter that can generate an optical signal with one or any combination of these characteristics is an electro-absorptively (EA) modulated optical transmitter. The optical transmitter 200 illustrated in FIG. 4 is an exemplary EA optical modulated transmitter. Numerous types of EA modulated sources can be used in an optical transmitter according to the present invention. In other embodiments, other types of intensity modulators are used.

The optical transmitter 200 includes a laser 202 that generates a continuous wave (CW) optical signal at an output 204. In some embodiments, the laser 202 is a semiconductor diode laser. However, other types of lasers can also be used. The transmitter 200 also includes a laser bias circuit 206. An output 208 of the laser bias circuit 206 is electrically connected to a bias input 210 of the laser 202. The laser bias circuit 206 generates a current at the output 208 that biases the laser 202.

The optical transmitter 200 also includes an Electro-Absorption Modulator (EAM) 210 that modulates the CW optical signal generated by the laser 202. In some embodiments, the laser 202 and the EAM 210 are separate discrete components. In other embodiments, the laser 202 and the EAM 210 are physically integrated on a single substrate. The EAM 210 includes an optical input 212, a bias and modulation input 214, and an optical output 216. The optical input 212 is positioned in optical communication with the output 204 of the laser 202. A waveguide, such as an optical fiber, can be used to optically couple the output 204 of the laser 202 to the optical input 212 of the EAM 210.

The optical transmitter 200 including the EAM 210 generates optical signals with improved or optimal spectral and phase characteristics for transmission through a multi-mode optical fiber link. The modulated optical signal that is generated by the optical transmitter 200 including the EAM 210 has very little phase information because EA modulators operate as efficient intensity modulators.

In one embodiment of the invention, the EAM 210 is specifically designed and fabricated to have at least one parameter that causes the EAM 210 to modulate intensity so as to suppress time varying phase and sideband information in the transmission spectrum. EA modulators are relatively efficient intensity modulators. Therefore, time varying phase and sideband information in the transmission spectrum is generally suppressed. However, a transmitter according to one embodiment of the invention can be designed, fabricated, and/or operated to further reduce time varying phase and sideband information in the transmission spectrum.

There are numerous physical EA modulator parameters that can be adjusted to change the amplitude and phase characteristics of the modulated optical signal in order to suppress phase and sideband information from the transmission spectrum. For example, parameters, such as the extinction ratio or voltage swing of the EA modulator, polarization properties, the 3-dB bandwidth, the facet coating properties, the input third-order intercept (IIP3), and the spurious free dynamic range (SFDR) can be adjusted during design and fabrication to suppress phase and sideband information from the transmission spectrum. Adjusting the extinction ratio of the EA modulator has been shown to suppress phase and sideband information from the transmission spectrum and, consequently, to increase the signal-to-noise ratio of optical signals propagating through multi-mode optical fiber. In one embodiment of the invention, the extinction ratio of the EA modulator 210 is in the range of about five to fifteen.

The optimal value of the extinction ratio is a function of the length of the multi-mode optical fiber. The optimal value of the extinction ratio can also be a function of the number of the fiber connectors and the alignment of the fiber connectors in the multi-mode optical fiber link 104 (FIG. 1) and the single mode optical fiber link 152 (FIG. 2). In addition, the optimal value of the extinction ratio can also be a function and many environmental factors, such as the level of the vibration, mechanical strain, thermal shock, and optical power fluctuations in the optical fiber link.

In one example, an EA modulator with an extinction ratio of about 11.5 has been shown to transmit optical signals through a 1250 foot multi-mode optical fiber link with relatively low phase and sideband information and relatively high signal-to-noise ratio compared with EA modulators having extinction ratios of about five and about eight in the same optical fiber link under similar environmental conditions. In another example, an EA modulator with an extinction ratio of about ten has been shown to transmit optical signals through a 4500 foot multi-mode optical fiber link with relatively low phase and sideband information and relatively high signal-to-noise ratio compared with an EA modulator having an extinction ratio of about five in the same optical fiber link under similar environmental conditions.

The optical transmitter 200 also includes a bias and data multiplexing circuit 218 that generates the desired electrical bias and data signals for the EAM 210. In some embodiments, the bias and data multiplexing circuit 218 includes two physically separate components. In other embodiments, the bias and data multiplexing circuit 218 is one component as shown in FIG. 4. An output 220 of the bias and data multiplexing circuit 218 is electrically connected to the modulation input 214 of the EAM 210. The EAM 210 modulates the CW optical signal generated by the laser 202 with an electronic data signal generated by the bias and data multiplexing circuit 218. The modulated optical signal propagates from the optical output 216 of the EAM 210.

In one embodiment of the invention, the operating conditions of the EAM 210 are chosen so as to suppress phase and/or sideband information in the transmission spectrum generated by the EAM 210. For example, the operating temperature of the EAM 210 and the bias voltage that is generated by the bias and data multiplexing circuit 218 and applied to the modulation input 214 of the EAM 210 can be adjusted during operation to suppress phase and/or sideband information from the optical signal.

In addition, parameters of the laser 202 that generates the optical signal which is modulated by the EAM 210 can be adjusted to suppress phase and/or sideband information from the transmission spectrum. For example, parameters, such as the wavelength and the optical mode structure of the optical signal generated by the laser 202 can be adjusted so as to suppress phase information and/or sideband information from the modulated optical signal.

The modulated optical signal that is generated by the optical transmitter 200 including the EAM 210 has certain characteristics in its transmission spectrum that increase the effective modal bandwidth of the optical fiber link. For example, one characteristic of the transmission spectrum is that the optical signal has minimal time varying phase. Another characteristic of the transmission spectrum is that it has minimal sideband information.

The modulated optical signal that is generated by the optical transmitter 200 requires essentially no phase information to transmit the data in an optical link, such as the multi-mode optical fiber link 104 (FIG. 1) and the single-mode optical fiber link 152 (FIG. 2). In addition, the modulated optical signal that is generated by the optical transmitter 200 has good isolation from optical signals reflecting back towards the optical transmitter 200.

Thus, the optical transmitter 200 improves the spectral and phase characteristics for transmission through multi-mode optical fiber links, such as the multi-mode optical fiber link 104 that is described in connection with FIG. 1. In addition, the optical transmitter 200 improves the spectral and phase characteristics for transmission through single-mode optical fiber links, such as the single-mode optical fiber link 152 that is described in connection with FIG. 2.

There are numerous other types of optical transmitters that when designed, fabricated, and operated according to the present invention will generate optical signals with improved or optimal spectral and phase characteristics for transmission through a multi-mode and single-mode optical fiber link. These optical transmitters include electro-absorption modulated lasers (EMLs), laser modulators, and electro-optic modulators.

Figure 5:
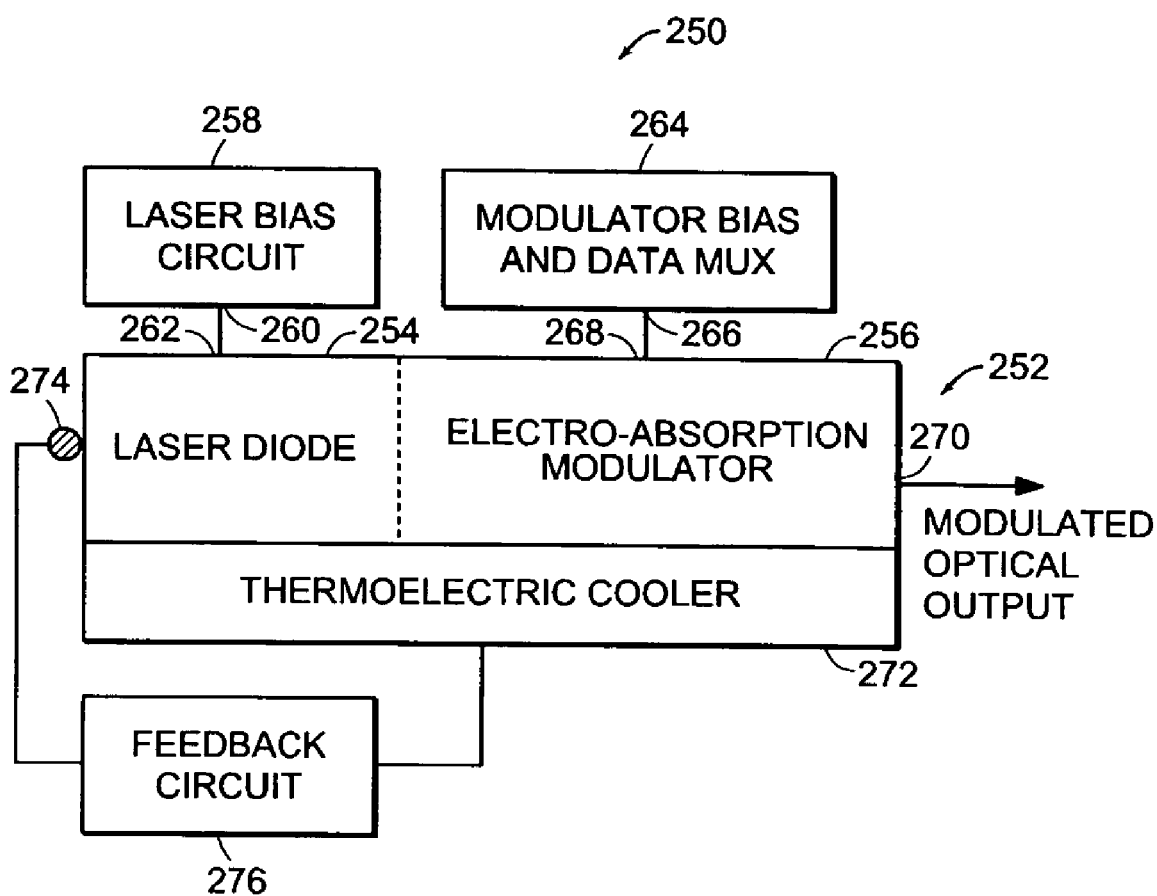
FIG. 5 illustrates a block diagram of an optical transmitter that includes an electro-absorption modulated laser (EML) according to the present invention that generates optical signals with improved or optimal spectral and phase characteristics for transmission through an optical fiber link.

FIG. 5 illustrates a block diagram of an optical transmitter 250 that includes an electro-absorption modulated laser (EML) 252 according to the present invention that generates optical signals with improved or optimal spectral and phase characteristics for transmission through an optical fiber link. The EML 252 includes a laser diode 254 section and an electro-absorption modulator (EAM) 256 section.

The laser diode 254 section is typically a distributed feedback (DFB) laser. The EAM 256 is typically a device that includes a semiconductor layer, such as a multi-quantum well semiconductor layer. The semiconductor layer typically has a slightly larger absorption band edge than the photon energy of the light being modulated. The laser diode 254 section is optically coupled to the EAM 256 section. The laser diode 254 section and EAM 256 section are typically integrated onto a single substrate, but can be physically separate devices.

A laser bias circuit 258 has an output 260 that is electrically coupled to a bias input 262 of the laser diode 254. The laser bias circuit 258 generates a continuous wave (CW) current that drives the laser diode 254, thereby causing the laser diode 254 to emit substantially monochromatic light of a predetermined wavelength.

A modulator bias and data multiplexing circuit 264 has an output 266 that is electrically coupled to a modulation input 268 of the EAM 256. The modulator bias and data multiplexing circuit 264 generates a voltage across the multi-quantum well semiconductor layer that produces a reverse bias modulating electric field across the semiconductor layer of the EAM 256. The reverse bias modulating electric field causes the absorption edge of the semiconductor layer of the EAM 256 to reversibly move to a longer wavelength, which corresponds to a lower absorption edge. The lower absorption edge causes the semiconductor layer of the EAM 256 to absorb the light generated by the laser diode 254 section that propagates through the semiconductor layer of the EAM 256.

Reducing the voltage across the multi-quantum well semiconductor layer results in the elimination or reduction of the reverse bias electric field, which causes the semiconductor layer of the EAM 256 to allow light generated by the laser diode 254 to transmit through the semiconductor layer of the EAM 256. Therefore, light emitted from the laser diode 254 that propagates to the EAM 256 is modulated by modulating the voltage across the multi-quantum well semiconductor layer of the EAM 256. The light emitted is modulated between a sufficient reverse bias voltage across the semiconductor layer that causes the layer to be substantially opaque to the light emitted from the laser diode 254, and substantially zero or a sufficiently positive bias voltage that causes the layer to be substantially transparent to the light emitted from the laser diode 254.

The resulting modulated light is emitted at an optical output 270 of the EML 252. The optical output 270 is directly coupled to the single-mode optical fiber 108 (FIGS. 1 and 2). The wavelength of the modulated light can be controlled by adjusting the amplitude of the CW current generated by the laser bias circuit 258 and applied to the laser diode 254. The wavelength of the modulated light can also be controlled by adjusting the temperature of the laser diode 254.

The EML 252 includes a thermoelectric cooler (TEC) 272 that controls the temperature of the laser diode 254 and the EAM 256. The temperature of the EML 252 can be stabilized by using a thermal sensor 274 and a feedback circuit 276. The thermal sensor 274 is thermally coupled to the laser diode 254 and is electrically coupled to the feedback circuit 276. The feedback circuit 276 is electrically coupled to the TEC 272. The feedback circuit 276 receives a signal from the thermal sensor 274 that is related to the temperature of the laser diode 254 and generates a signal in response to the temperature. The signal generated by the feedback circuit 276 controls the thermal properties of the TEC 272 to maintain the laser diode 254 at a predetermined operating temperature (and thus the major portion of spectral energy of the emitted light at the desired wavelength) independent of ambient temperature.

In one embodiment of the invention, the EML 252 is specifically designed and fabricated to have at least one parameter that causes the EML 252 to generate a transmission spectrum with suppressed phase and sideband information. There are numerous physical EML parameters that can be adjusted to change the amplitude and phase characteristics of the modulated optical signal in order to suppress phase and sideband information from the transmission spectrum.

For example, parameters of the EAM 256, such as the extinction ratio, the polarization properties, the 3-dB bandwidth, the modulator chirp, the optical mode structure, the input third-order intercept (IIP3), the spurious free dynamic range (SFDR), and the output facet coating properties can be adjusted during design and fabrication to suppress phase and/or sideband information from the transmission spectrum.

Also, parameters of the laser diode 254, such as the wavelength, the optical mode structure, and the parameters of the output facet coating can be adjusted during design and fabrication to suppress phase and/or sideband information from the transmission spectrum. In addition, parameters specific to EML devices, such as the electrical isolation and the optical coupling between the laser diode 254 and the EAM 256 can be adjusted during design and fabrication to suppress phase and/or sideband information from the transmission spectrum.

In one embodiment of the invention, the operating conditions of the EML 252 are chosen so as to suppress phase and/or sideband information in the transmission spectrum. For example, operating conditions, such as the current generated by the laser bias circuit 258 and the resulting optical power received by the EAM 256, the bias voltage swing that is generated by the bias and data multiplexing circuit 264 and received by the EAM 256, and the operating temperature of the laser diode 254 and the EAM 256 can be adjusted during operation of the EML 252 to suppress phase and/or sideband information in the transmission spectrum.

Figure 6:
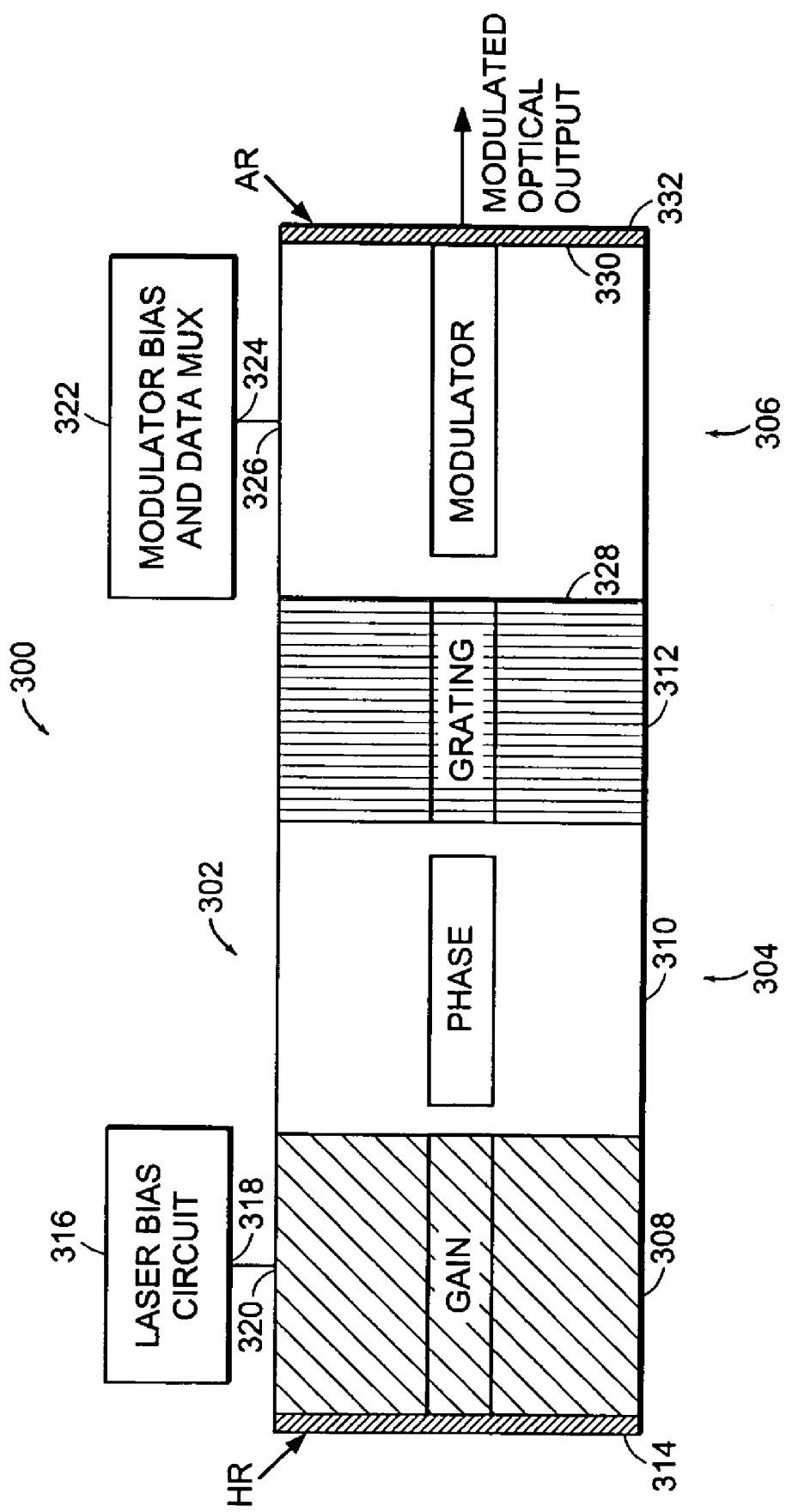
FIG. 6 illustrates a block diagram of an optical transmitter that includes an embodiment of a laser modulator according to the present invention that generates optical signals with improved or optimal spectral and phase characteristics for transmission through an optical fiber link.

The present invention can also be practiced with numerous types of laser modulators. FIG. 6 illustrates a block diagram of an optical transmitter 300 that includes an embodiment of a laser modulator 302 according to the present invention that generates optical signals with improved or optimal spectral and phase characteristics for transmission through an optical fiber link. The optical transmitter 300 includes a laser section 304 and a modulator section 306.

The laser section 304 of the laser modulator 302 shown in FIG. 6 is a tunable three section Distributed Bragg Reflector (DBR) laser. In other embodiments (not shown), a single section DFB laser can be used if wavelength tuning is not desirable. The laser section 304 includes a gain section 308, a phase section 310, and a grating section 312 that are butted together. The gain section 308 generates an optical signal. The phase section 310 introduces an optical phase shift to tune the laser wavelength. The grating section 312 forms a DBR mirror.

A high reflection coating 314 is deposited on one side of the gain section 308. A laser cavity is formed between the high reflection coating 314 and the DBR mirror formed by the grating section 312. The optical transmitter 300 includes a laser bias circuit 316 having an output 318 that is electrically connected to a bias input 320 of the gain section 308. The laser bias circuit 316 generates a current at the output 318 that biases the gain section 308 to emit the desired optical signal. The design and operation of such lasers are well known in the art.

The modulator section 306 of the laser modulator 302 is positioned outside of the laser cavity beyond the DBR mirror in the grating section 312. Forming the modulator section 306 external to the laser cavity introduces relatively low wavelength chirp into the modulated optical signal. An input 328 of the modulator section 306 is optically coupled to the grating section 312. An output facet 330 of the modulator section 306 transmits the modulated optical signal. An anti-reflection coating 332 is deposited on the output facet 330 of the modulator section 306 to prevent undesired reflection from entering the laser cavity.

A modulator bias and data multiplexing circuit 322 has an output 324 that is electrically coupled to a modulation input 326 of the modulator section 306. The modulator section 306 is an intensity modulator that modulates a CW optical signal that is generated by the laser section 304 with the data generated by the modulator bias and data multiplexing circuit 322. The modulated optical signal is transmitted though the output facet 330 of the modulator section 306 and the anti-reflection coating 332.

Many different types of modulator sections 306 can be used with an optical transmitter 300. For example, the modulator section 306 can be a Franz-Keldysh-type electro-absorption modulator section. Such a modulator section 306 includes a section of waveguide with an active region of bulk semiconductor heterostructure material having a slightly larger bandgap energy than the photon energy of the optical signal being modulated. When the modulator bias and data multiplexing circuit 322 applies a reverse bias field to the modulation input 326 of the modulator section 306, the absorption edge is lowered, thus reducing the light emitted.

The modulator section 306 can also be a modulated amplifier-type modulator. Such a modulator includes a gain section that can be formed of the same material as the gain section 308 in the laser cavity. Modulated amplifier-type modulators can achieve relatively broad optical bandwidth. In addition, the modulator section 306 can be a guide/antiguide-type modulator. Guide/antiguide modulators use refractive index effects to achieve intensity modulation. However, unlike other devices that use refractive index effects, such as Mach-Zehnder type modulators, these modulators do not generate large amounts of phase and sideband information in the transmission spectrum because they do not use interference effects.

In one embodiment of the invention, the optical transmitter 300 is specifically designed and fabricated to have at least one parameter that causes the optical transmitter 300 to generate a transmission spectrum with suppressed phase and sideband information. There are numerous physical parameters of the laser section 304 and the modulator section 306 that can be adjusted to change the amplitude and phase characteristics of the modulated optical signal in order to suppress phase and sideband information from the transmission spectrum.

For example, parameters of the laser section 304, such as the wavelength, the optical mode structure, and the parameters of the output facet coating can be adjusted during design and fabrication to suppress phase and/or sideband information from the transmission spectrum. In addition, parameters specific to DBR and DFB laser devices, such as the grating parameters and the properties of the waveguides in the gain section 308, the phase section 310, and the grating section 312, as well as the coupling parameters between these sections, can be adjusted during design and fabrication to suppress phase and/or sideband information from the transmission spectrum.

Also, parameters of the modulator section 306, such as the extinction ratio, the polarization properties, the 3-dB bandwidth, the modulator chirp, the optical mode structure, the input third-order intercept (IIP3), the spurious free dynamic range (SFDR), the lateral index guide and antiguide profiles (for guide/antiguide-type modulators), and the output facet coating properties can be adjusted during design and fabrication to suppress phase and/or sideband information from the transmission spectrum.

In one embodiment of the invention, the operating conditions of the optical transmitter 300 are chosen so as to suppress phase and/or sideband information in the transmission spectrum. For example, the current generated by the laser bias circuit 316 and the resulting optical power received by the modulator section 306, the bias voltage that is generated by the bias and data multiplexing circuit 322 and received by the modulator section 306, and the operating temperature of the laser section 304 and the modulator section 306 can be adjusted during operation to suppress phase and/or sideband information from the transmission spectrum.

The optical transmitters described herein that generate optical signals with improved or optimal spectral and phase characteristics for transmission through an optical fiber link can be used for transmitting 10GEthernet data in multi-mode optical fiber transmission systems greater than 300 meters long. Error free transmission of optical signals having a 1310 nm wavelength over 300 meters of multi-mode optical fiber using such optical transmitters has been demonstrated.

Figure 7:
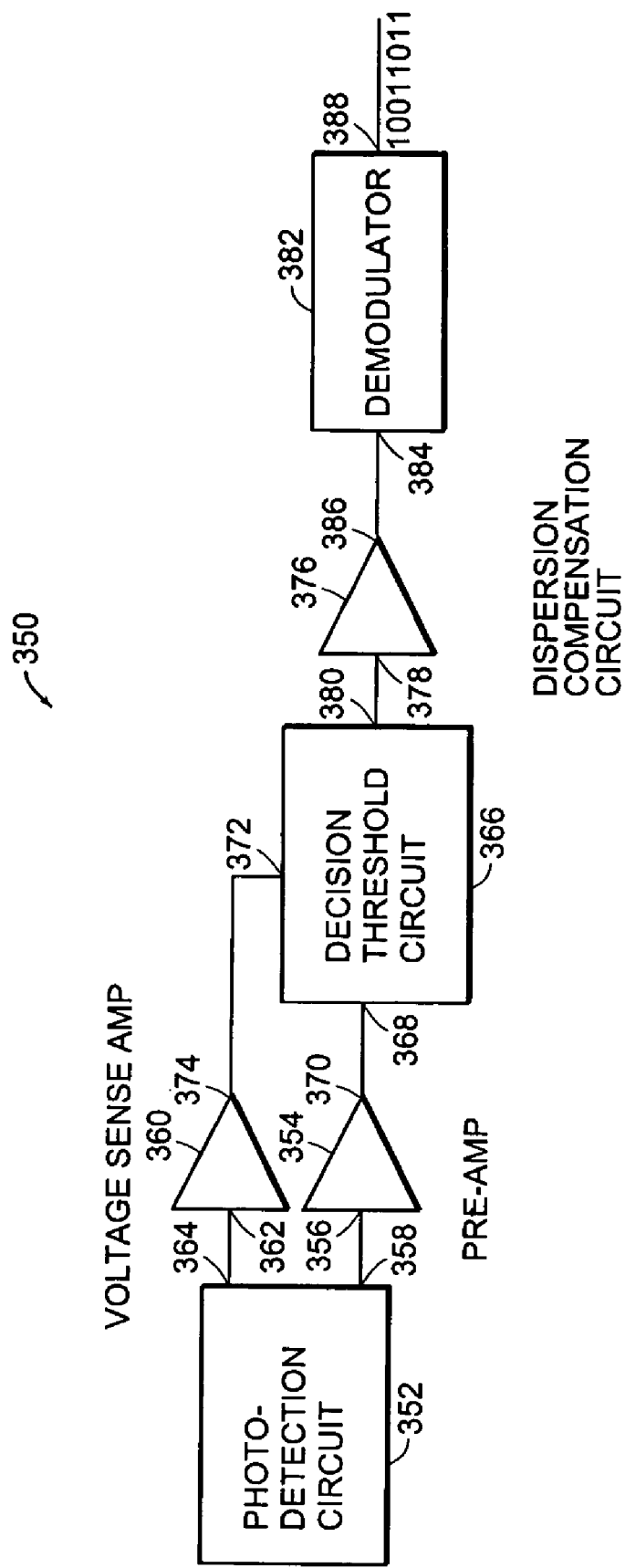
FIG. 7 illustrates a block diagram of one embodiment of an optical receiver for the optical fiber transmission system with increased effective modal bandwidth according to the present invention that includes dynamic re-optimization and electronic dispersion compensation.

FIG. 7 illustrates a block diagram of one embodiment of an optical receiver 350 for the optical fiber transmission system with increased effective modal bandwidth according to the present invention that includes dynamic re-optimization and electronic dispersion compensation. The dynamic re-optimization and electronic dispersion compensation alone or in combination increase the bandwidth-distance product of the optical fiber transmission system according to the present invention.

The optical receiver 350 includes a photo-detection circuit 352 that is optically coupled to the output of the second single-mode optical fiber 118 (FIGS. 1 and 2). The photo-detection circuit 352 includes a photo-diode that converts the received optical signal into an electrical signal. The optical receiver 350 also includes a pre-amplifier 354 having an input 356 that is electrically connected to a signal output 358 of the photo-detection circuit 352. The pre-amplifier 354 amplifies the electrical signal generated by the photo-detection circuit 352 to a signal level that is suitable for electronic processing.

The optical receiver 350 also includes a voltage sensing amplifier 360 having an input 362 that is electrically connected to a control output 364 of the photo-detection circuit 352. The voltage sensing amplifier 360 generates a feed forward signal having a voltage that is proportional to the average optical power level of the received optical signal. A decision threshold circuit 366 has a signal input 368 that is electrically connected to an output 370 of the pre-amplifier 354 and a control input 372 that is electrically connected to an output 374 of the voltage sensing amplifier 360. The decision threshold circuit 366 adjusts the decision threshold in the optical receiver 350 to the optimal threshold for the received power level in order to maximize the signal-to-noise ratio of the optical receiver 350.

The optical receiver 350 includes an electronic dispersion compensation circuit 376 having an input 378 that is electrically connected to an output 380 of the decision threshold circuit 366. The electronic dispersion compensation circuit 376 compensates for the effects of dispersion by reconstructing the dispersed optical signals. Dispersion can severely degrade signals in the optical fiber transmission systems 100, 150 that are described in connection with FIG. 1 and FIG. 2. Several different types of dispersion can occur in these optical fiber transmission systems.

For example, chromatic dispersion can occur in WDM optical fiber transmission systems. Chromatic dispersion is caused by differences in the speed at which signals having different wavelengths travel in the optical fiber link. Chromatic dispersion generally decreases the acceptable transmission distance as the square of the bit rate.

Polarization mode dispersion (PMD) occurs when the orthogonal polarization components of the optical signal travel at different rates in the optical fiber link. Polarization mode dispersion results from asymmetries in the optical fiber core. Polarization mode dispersion causes a statistical disruption in network operation and, consequently, limits the transmission distance.

Signal degradation caused by these dispersions, if uncompensated, can corrupt the received optical signal by broadening the pulses in the optical signal, which causes Inter Symbol Interference (ISI). The ISI will eventually degrade the signal quality enough for the signal to fall below the acceptable threshold for service. Thus, these dispersions can limit the possible bandwidth-distance product in the optical fiber links and can cause service interruptions.

The dispersion compensation circuit 376 includes at least one active filter. There are many different types of active filters know in the art that are suitable for electronic dispersion compensation. For example, the active filter can be a Finite Impulse Response (FIR) filter, such as a Feed Forward Equalizer (FFE) filter. Such filters sample the received signal, after electro-optic conversion by the photo-detection circuit 352. Different delayed samples are scaled and then summed once per sample clock. The length of the FIR filter (i.e. the number of taps) is related to the amount of ISI that is incurred during transmission.

The dispersion compensation circuit 376 can also include a Decision Feedback Equalizer (DFE) filter that is used with the FFE filter to further reduce the ISI in the optical signal. The DFE filter takes the decisions from the FFE filter as its input. The output of the DFE is combined with the output of the FFE filter and is then fed back to the input of the DFE filter. The clock and data are then recovered from the dispersion compensated signal.

The optical receiver 350 also includes a demodulator 382 having an input 384 that is electrically connected to an output 386 of the dispersion compensation circuit 376. The demodulator 382 demodulates the reconstructed optical signal and recovers the transmitted data. The demodulator 382 generates the recovered data at an output 388.

Equivalents

While the invention has been particularly shown and described with reference to specific preferred embodiments, it should be understood by those skilled in the art that various changes in form and detail may be made therein without departing from the spirit and scope of the invention as defined by the appended claims.

Signal degradation caused by these dispersions, if uncompensated, can corrupt the received optical signal by broadening the pulses in the optical signal, which causes Inter Symbol Interference (ISI). The ISI will eventually degrade the signal quality enough for the signal to fall below the acceptable threshold for service. Thus, these dispersions can limit the possible bandwidth-distance product in the optical fiber links and can cause service interruptions.

The dispersion compensation circuit 376 includes at least one active filter. There are many different types of active filters know in the art that are suitable for electronic dispersion compensation. For example, the active filter can be a Finite Impulse Response (FIR) filter, such as a Feed Forward Equalizer (FFE) filter. Such filters sample the received signal, after electro-optic conversion by the photo-detection circuit 352. Different delayed samples are scaled and then summed once per sample clock. The length of the FIR filter (i.e. the number of taps) is related to the amount of ISI that is incurred during transmission.

The dispersion compensation circuit 376 can also include a Decision Feedback Equalizer (DFE) filter that is used with the FFE filter to further reduce the ISI in the optical signal. The DFE filter takes the decisions from the FFE filter as its input. The output of the DFE filter is combined with the output of the FFE filter and is fed back to the input of the DFE filter. The clock and data are then recovered from the dispersion compensated signal.

The optical receiver 350 also includes a demodulator 382 having an input 384 that is electrically connected to an output 386 of the dispersion compensation circuit 376. The demodulator 382 demodulates the reconstructed optical signal and recovers the transmitted data. The demodulator 382 generates the recovered data at an output 388.

Equivalents

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A multi-mode optical fiber link comprising:
   a) an optical source comprising a modulator electrically coupled to a bias and data multiplexing circuit, the optical source having an output that is optically coupled to an input of a first single mode optical fiber, the optical source generating an optical signal with relatively low time varying phase and sideband information;
   b) a first spatial mode converter having an input that is coupled to the output of the single mode optical fiber, the first spatial mode converter conditioning a modal profile of the optical signal while maintaining the relatively low sideband information;
   c) a multi-mode optical fiber having an input that is coupled to an output of the first spatial mode converter; and
   d) a second spatial mode converter having an input that is coupled to an output of the multi-mode optical fiber and an output that is coupled to a second single mode optical fiber, the second spatial mode converter reducing a number of optical modes in the optical signal, wherein both the first and the second spatial mode converters increase an effective modal bandwidth of the optical signal while maintaining the relatively low sideband information.

2. The optical fiber link of claim 1 wherein the optical source comprises an intensity modulated optical source.

3. The optical fiber link of claim 1 wherein the optical source comprises an electro-absorption modulated laser.

4. The optical fiber link of claim 1 wherein the optical source comprises an integrated laser modulator.

5. The optical fiber link of claim 1 further comprising a second optical source having an output that is coupled to the input of the single mode optical fiber, the second optical source generating a second optical signal having a second wavelength at the output.

6. The optical fiber link of claim 1 further comprising a second optical source having an output that is coupled to the output of the second spatial mode converter, the second optical source generating a second optical signal having a second wavelength at the output.

7. The optical fiber link of claim 1 wherein at least one of the first and the second spatial mode converters comprise a fusion splice between the multi-mode optical fiber and a respective one of the single mode optical fiber and the second single mode optical fiber.

8. The optical fiber link of claim 1 wherein at least one of the first and the second spatial mode converters comprises a lens imaging system comprising refractive and diffractive elements.

9. The optical fiber link of claim 1 wherein the first spatial mode converter optically couples the single mode optical fiber to the multi-mode optical fiber so as to achieve a predetermined offset between a core of the single mode optical fiber and a core of the multi-mode optical fiber.

10. The optical fiber link of claim 1 further comprising a third single-mode optical fiber that couples a first and a second segment of the multi-mode optical fiber.

11. A method of increasing effective modal bandwidth of an optical signal transmitting through a multi-mode optical fiber, the method comprising:
   e) generating an optical signal using a modulator coupled to a bias and data multiplexing circuit with relatively low time varying phase and sideband information;
   f) spatial mode converting the optical signal, thereby reducing modal dispersion and increasing an effective bandwidth of the optical signal while maintaining the relatively low sideband information;
   g) propagating the spatially mode converted optical signal through a multi-mode optical fiber; and
   h) spatial mode converting the spatially mode converted optical signal propagated through the multi-mode optical fiber while maintaining the relatively low sideband information, thereby further reducing modal dispersion and further increasing the effective bandwidth of the optical signal.

12. The method of claim 11 wherein the spatial mode converting at least one of the optical signal and the spatially mode converted optical signal reduces changes in effective modal bandwidth of the optical signal that are caused by thermal variations in the multi-mode optical fiber.

13. The method of claim 11 wherein the spatial mode converting at least one of the optical signal and the spatially mode converted optical signal reduces changes in effective modal bandwidth of the optical signal that are caused by polarization effects in the multi-mode optical fiber.

14. The method of claim 11 wherein the spatial mode converting at least one of the optical signal and the spatially mode converted optical signal reduces changes in effective modal bandwidth of the optical signal that are caused by mechanical stress in the multi-mode optical fiber.

15. The method of claim 11 wherein the spatial mode converting at least one of the optical signal and the spatially mode converted optical signal reduces changes in effective modal bandwidth of the optical signal that are caused by optical fiber splices in the multi-mode optical fiber.

16. The method of claim 11 wherein the optical signal comprises more than one optical wavelength.

17. The method of claim 11 further comprising selecting a bandwidth of the optical signal to suppress at least one of phase and sideband information.

18. The method of claim 11 wherein the generating the optical signal with relatively low time varying phase and sideband information comprises intensity modulating the optical signal.

19. The method of claim 18 further comprising selecting an absorption spectrum of the intensity modulation to reduce at least one of phase and sideband information.

20. The method of claim 18 further comprising selecting an extinction ratio of the intensity modulation to reduce at least one of phase and sideband information.

21. The method of claim 18 further comprising selecting an absorption coefficient of the intensity modulation to reduce at least one of phase and sideband information.

22. A multi-mode optical communication system comprising:
   i) an optical transmitter comprising a modulator electrically coupled to a bias and data multiplexing circuit, the optical transmitter generating an optical signal with relatively low time varying phase and sideband information at an output;
   j) a first spatial mode converter having an input that is coupled to the output of the optical transmitter, the first spatial mode converter conditioning a modal profile of the optical signal while maintaining the relatively low sideband information;
   k) a multi-mode optical fiber having an input that is coupled to an output of the first spatial mode converter;
   l) a second spatial mode converter having an input that is coupled to an output of the multi-mode optical fiber, the second spatial mode converter reducing a number of optical modes in the optical signal, wherein both the first and the second spatial mode converters increase an effective modal bandwidth of the optical signal while maintaining the relatively low sideband information; and m) an optical receiver having an input that is coupled to an output of the second spatial mode converter, the optical receiver receiving the optical signal transmitted through the second spatial mode converter.

23. The communication system of claim 22 wherein the optical transmitter comprises an electro-absorption modulated laser.

24. The communication system of claim 22 wherein the optical transmitter comprises an integrated laser modulator.

25. The communication system of claim 22 wherein the optical signal generated by the optical transmitter comprising more than one optical wavelength.

26. The communication system of claim 22 further comprising a single-mode optical fiber that couples a first and a second segment of the multi-mode optical fiber.

27. The communication system of claim 22 wherein the optical receiver comprises an active filter that reconstructs dispersed optical signals received by the optical receiver.

28. The communication system of claim 22 wherein the optical receiver automatically adjusts at least one receiver parameter in order to compensate for changes in an average power of the received optical signal.

29. The communication system of claim 22 wherein the optical receiver automatically adjusts at least one receiver parameter so as to maintain a substantially constant bit error rate as the average power of the received optical signal changes.

30. The communication system of claim 29 wherein the at least one receiver parameter comprises receiver sensitivity.

* * * * *